United States Patent [19]
Cho et al.

[11] Patent Number: 5,795,516
[45] Date of Patent: Aug. 18, 1998

[54] METHOD FOR FABRICATING OLEFIN TARPAULINS

[75] Inventors: Suh H. Cho. Sungnam; Il Y. Kim; Chung S. Kang, both of Seoul; Chang B. Jung, Anyang; Hae J. Lee, Seoul; Il Y. Jung; Chang G. Kim, both of Kyunggi-do, all of Rep. of Korea

[73] Assignee: Kolon Industries, Inc., Seoul, Rep. of Korea

[21] Appl. No.: 842,424

[22] Filed: Apr. 24, 1997

[30] Foreign Application Priority Data

| Jul. 26, 1996 | [KR] | Rep. of Korea | 30521/96 |
| Oct. 30, 1996 | [KR] | Rep. of Korea | 49869/96 |
| Dec. 23, 1996 | [KR] | Rep. of Korea | 70174/96 |

[51] Int. Cl.$^6$ .................. B29C 47/06; B32B 5/12
[52] U.S. Cl. ............. 264/103; 264/171.23; 264/171.24; 264/173.1; 264/211; 427/209; 427/365
[58] Field of Search .............. 264/103, 171.23, 264/171.24, 173.1, 211; 427/209, 365

[56] References Cited

U.S. PATENT DOCUMENTS

| 4,259,379 | 3/1981 | Britton et al. | 427/365 X |
| 4,298,645 | 11/1981 | Obayashi et al. | 428/110 |
| 4,407,690 | 10/1983 | White | 427/365 X |
| 4,929,303 | 5/1990 | Sheth | 264/173.1 X |

*Primary Examiner*—Leo B. Tentoni
*Attorney, Agent, or Firm*—Oblon, Spivak, McClelland, Maier & Neustadt, P.C.

[57] ABSTRACT

A method for fabricating olefin tarpaulins by treating both sides of a base fabric woven from high strength polyester filaments with a coating composition using an extruder followed by compressing the coated polyester fabrics with a calendering roller. The coating composition is obtained by dry-blending or melt-blending LLDPE (linear low density polyethylene) or LDPE (low density polyethylene) in an amount of 15~94.5% by weight with an elastomer of ethylene-α-olefin co-polymer of 5~60% by weight which are (i) ethylene propylene rubbers or (ii) co-polymers of ethylene and octene or butene; coloring master batch chip in an amount of 0.5~15% by weight obtained by mixing LLDPE or LDPE with pigments or titanium dioxide; and adhesion-preventing master batch chip of 0~10% by weight obtained by mixing LLDPE or LDPE with silica or calcium carbonate.

11 Claims, 1 Drawing Sheet

5,795,516

METHOD FOR FABRICATING OLEFIN TARPAULINS

BACKGROUND OF THE INVENTION

1. Field of the Invention

The present invention relates to a method for fabricating olefin tarpaulins.

More particularly it relates to a method for fabricating olefin tarpaulins which have a light weight per area and produce no poisonous gas during its incineration, formed by coating films of olefin synthetic resins to both sides of base fabrics woven from high strength polyester filaments by using an extruder and a calendering roller so as to make the coating films adhered to each other through the voids in the polyester fabrics, thereby leading to a simple process for fabricating tarpaulins that requires no special binder treatment.

2. Discription of Prior Art

In general, tarpaulins are known as waterproof canvas widely used for sheets to cover goods placed outdoors, freight cars or vehicles, consisting of fabrics which is woven synthetic filament such as HDPE (high density polyethylene), polyester and nylon filaments, and synthetic resins such as LDPE (low density polyethylene) and PVC (polyvinyl chloride) which is coated both side of the fabrics. In general tarpaulins have the thickness between 0.35 to 1.20 mm.

Tarpaulins are used for various purposes in farming, building, commercial, leisure, transportation and housing fields.

In the farming field, tarpaulins are used for sheets for farming machines, a temporary granary, a poultry farm interior ceiling, a sun screen, a thermo tent and a temporary irrigation water path. Tarpaulins are employed for a building use as a windshield and cover sheets for construction materials and machines, and for a commercial use as a container bag, cover sheets for a water tank, wood materials and a simple frame warehouse.

For the use in leisure stuffs, tarpaulins are used for a boat cover, sheets for a swimming pool, a screen house and a beach parasol. The tarpaulins in the transportation use are formed into sheets to cover goods placed outdoors, freight cars or vehicles, a raincoat, a bag, a cover for a lawn-mower, a wood file for a fireplace, and a mat.

Out of the currently used tarpaulins, which are mostly made of PE (polyethylene) and PVC (polyvinyl chloride), the PE tarpaulin is fabricated by coating both sides of base fabrics woven from high density polyethylene filaments with synthetic resins such as LDPE (low density polyethylene) or LLDPE (linear low density polyethylene). This mode of fabricating the tarpaulin gives a strong adhesive strength between the coating materials such as LDPE or LLDPE and the polyethylene fabrics of high density polyethylene filaments, thereby requiring no binder treatment to increase the adhesive strength. However, it is defective in that the fabricated PE tarpaulin is inferior to the PVC tarpaulin in physical properties such as tensile and tearing strengths. With that reason, the PE tarpaulin rates as an inferior woven goods.

Korean Application Patent 81-79 discloses a method for fabricating PVC tarpaulin having the density of warp and weft between 8 and 15 threads per inch, woven from the non-twisted high strength polyester filaments of 500 to 1,500 denier as warp and weft.

To prevent any slip of warp and weft in the weaving process, the above method use a roller with a bearing which is rotated at a rotation speed equal to the linear speed of the woven fabrics instead of using a fixed breast beam, and use a friction roller, a surface roller and a guide roller which is winded by a gum strop.

In order to prevent the deformation of the woven fabrics caused by a dislodge of the warp and weft in the processing, it is suggested that the woven fabrics are treated with a slip-preventive agent such as polyacryl resins, set by a heat and coated with a polyvinyl chloride composition on the both sides thereof.

In addition, another method for fabricating a PVC tarpaulin is disclosed in U.S. Pat. No. 4,298,645.

The PVC tarpaulin produced in the above-described methods has been widely used as highly graded woven goods because it is superior to the PE tarpaulin in physical properties such as tensile and tearing strengths. However, it defectively has a heavy weight per area due to the PVC itself's density of about 1.40 $g/cm^3$ and causes an air pollution with poisonous gas generated during the incineration thereof.

Furthermore, because of the poor adhesive strength between the polyester fabrics and the PVC synthetic resins as a coating composition, the fabricating process becomes too complex and necessarily requires a binder treatment of the polyester fabrics before a coating process.

SUMMARY OF THE INVENTION

Accordingly, the present invention is directed to a method for fabricating olefin tarpaulins that substantially obviates one or more of the problems due to limitations and disadvantages of the related art.

An object of the present invention is to provide a method for fabricating olefin tarpaulins which have a light weight per area and produce no poisonous gas during its incineration, formed by coating films of olefin synthetic resins to both sides of base fabrics woven from high strength polyester filaments by using an extruder and a calendering roller so as to make the films adhered to each other between the base fabrics, thereby leading to a simple process of no special binder treatment.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a method for fabricating olefin tarpaulins, comprising the steps of: forming polyester fabrics having a density of warp and weft of 5~20 threads per inch from high strength polyester filaments; preparing a coating composition by blending LLDPE (linear low density polyethylene) or LDPE (low density polyethylene) of 15~94.5% by weight, elastomer of ethylene-α-olefin co-polymer of 5~60% by weight which is (i) ethylene propylene rubbers or (ii) co-polymers of ethylene and octene or butene, coloring master batch chip of 0.5~15% by weight formed by mixing LLDPE or LDPE with pigments or titanium dioxide ($TiO_2$), and adhesion-preventing master batch chip of 0~10% by weight formed by mixing LLDPE or LDPE with silica or calcium carbonate ($CaCO_3$); treating the polyester fabrics with the coating composition; and compressing the polyester fabrics with a calendering roller.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention:

In the drawings:

FIG. 1 and FIG. 2 are schematic diagrams illustrating a process for treating polyester fabrics with a coating composition in accordance with the present invention.

DESCRIPTION OF THE PREFERRED EMBODIMENT

Figure 1:
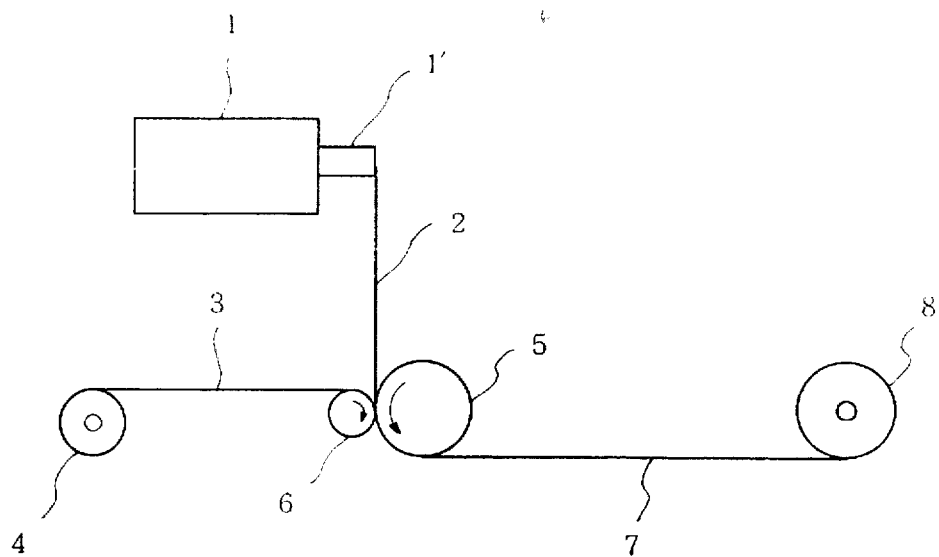

Reference will now be made in detail to the preferred embodiments of the present invention, examples of which are illustrated in the accompanying drawings.

First, there are formed base fabrics having the density of warp and weft of 5~20 threads per inch from high strength polyester filaments.

If the density of warp and weft in the polyester fabrics is less than 5 threads per inch, the tarpaulin will be inferior in physical properties such as tensile and tearing strengths. If more than 20 threads per inch, the tarpaulin will have a weakened adhesive strength because the voids where the coating compositions are adhered to each other in the polyester fabrics are too small to bind the coating composition with the fabrics.

The proper fineness of high density polyester filament is between 200 denier and 1,500 denier.

Thus formed polyester fabrics are then treated with olefin synthetic resins.

The coating composition of olefin synthetic resins is prepared by dry-blending or melt-blending LLDPE (linear low density polyethylene) or LDPE (low density polyethylene) of 15~94.5% by weight with: elastomer of ethylene-α-olefin co-polymer of 5~60% by weight which is (i) ethylene propylene rubbers or (ii) co-polymers of ethylene and octene or butene; coloring master batch chip of 0.5~15% by weight formed by mixing LLDPE or LDPE with pigments or titanium dioxide; and adhesion-preventing master batch chip of 0~ 10% by weight formed by mixing LLDPE or LDPE with silica or calcium carbonate.

The adhesion-preventing master batch chip can be optionally added to the coating composition of olefin synthetic resins as prepared according to the present invention.

If the content of the elastomer is less than 5% by weight, the tarpaulin becomes poor in flexibility. If over 60% by weight, the tensile strength of the tarpaulin will be lowered.

Further, the elastomer is preferably ethylene propylene rubbers, or co-polymers of ethylene of 70~90% by weight and octene or butene of 10~30% by weight.

The coloring master batch chip is prepared by mixing LLDPE or LDPE of 50~90% by weight with additives of 10~50% by weight such as pigments or titanium dioxide (TiO$_2$). If the content of the coloring master batch chip is less than 0.5% by weight, the tarpaulins become poor in color. If the content of the coloring master batch chip is more than 15% by weight, the tarpaulins become poor in adhensive strength. The adhesion-preventing master batch chip is formed by mixing LLDPE or LDPE of 50~90% by weight with silica or calcium carbonate of 10~50% by weight.

The adhesion-preventing master batch chip containing silica or calcium carbonate is preferably less than 10% by weight. If more than 10% by weight, it is not desirable because the overuse of the adhesive-preventing master batch chip will result in the increase of the production cost even though it may increase the adhesive strength.

In the next, both sides of the polyester fabrics woven from high strength polyester filaments are treated with the coating composition prepared as above. The polyester fabrics are coated with the coating composition of olefin synthetic resins alternatively on one side thereof or on both sides thereof. The method of treating the polyester fabrics with the coating composition is described in detail with reference to FIG. 1 and FIG. 2.

Referring to FIG. 1, the coating composition of olefin synthetic resins is extruded into a film 2 through an extruder 1 whose internal temperature is between 60°~300° C. and extruding die 1' is maintained at the temperature between 260°~330° C. The extruded coating composition film 2 is adhered to one side of polyester fabrics 3 through a calendering roller 5 whose temperature is below 60° C. Through a polyester fabric feeding roller 4, the polyester fabrics 3 is supplied to the calendering roller 5 and a silicone rubber roller 6. After adhering the coating composition film 2 to the supplied polyester fabrics 3 between the calendering roller 5 and the silicone rubber roller 6, the polyester fabrics treated with the coating composition are finally collected by a collecting roller 8. It is preferable to use silicone rubbers for the materials of the roller 6 being in contact with the polyester fabrics, and an unpolished roller for the roller 5 in contact with the coating composition.

Figure 2:
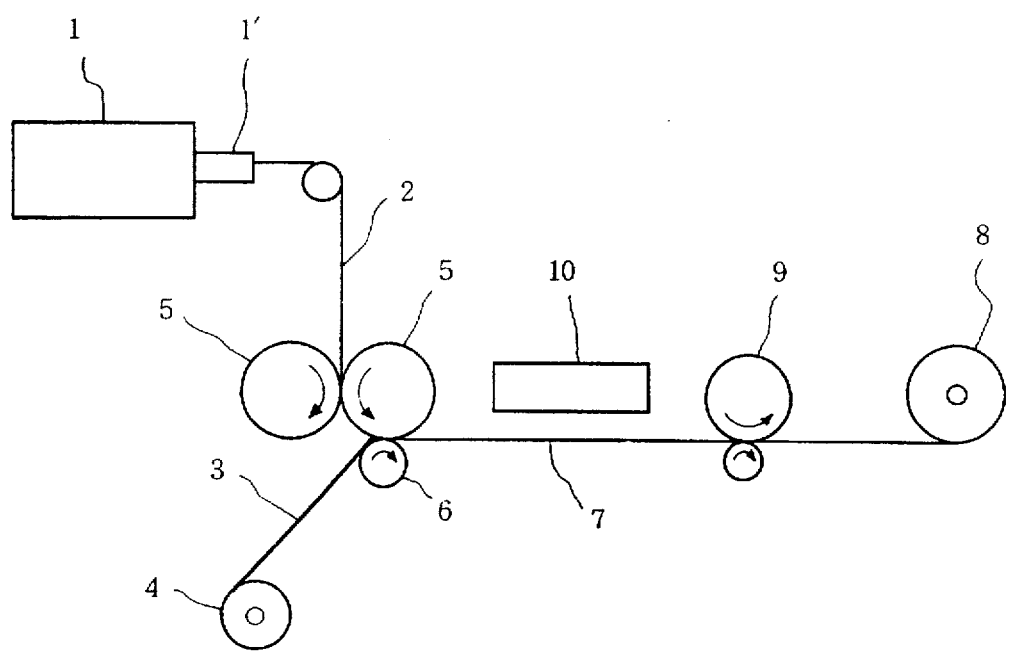

As shown in FIG. 2, the coating composition is melt and mixed at 200°~300° C. by using an extruder or a kneader 1. The melt coating composition is then transferred to a calendering roller 5 whose temperature is kept between 140° C. and 200° C. The coating composition film is adhered to polyester fabrics between the compressing rollers, the calendering roller 5 and a silicone rubber roller 6. Then, the coating composition treated on the polyester fabrics is heated by a heater 10 between the compressing roller 5, 6 and the unpolished roller 9, and treated by an unpolished roller 9, so that prominence and depression is effectively formed on the surface of the polyester fabrics 7, thereby increasing the unpolishness of the fabrics.

The above-described method can be applicable to the other side of the polyester fabrics, and thus the coating composition film of olefin synthetic resins is adhered to both sides of the polyester fabrics. The coating composition films on both sides of the polyester fabrics are adhered to each other through the voids of the polyester fabrics.

The olefin tarpaulin formed according to the present invention has a light weight per area, generates no poisonous gas in the incineration thereof and has excellent physical properties such as tensile, tearing and adhesive strengths. The thickness of the olefin tarpaulin is between 300 μm and 900 μm. Further, a binder treatment to increase the adhesive strength before a coating process is not required in the method of the present invention because the coating composition films are coupled with each other at voids of the polyester fabrics treated whose both sides are treated with the coating composition.

EXAMPLE 1

Polyester fabrics were produced by weaving high strength polyester filaments of 1,000 denier so as to have the density of warp and weft to be 5 threads per inch.

Then, a coating composition of olefin synthetic resins was prepared by melt-blending LLDPE (linear low density polyethylene) of 70% by weight, elastomer of 20% by weight which was co-polymers of ethylene of 80% by weight and butene of 20% by weight, coloring master batch chip of 5% by weight formed by mixing LLDPE 85% by weight and titanium dioxide of 15% by weight, and adhesion-preventing master batch chip of 5% by weight formed by mixing LLDPE of 95% by weight and silica of 5% by weight.

After the coating composition of olefin synthetic resins was treated on both sides of the polyester fabrics by using an extruder whose internal temperature was 240° C. and extruding die was maintained at 300° C., the polyester fabrics were compressed with a calendering roller of 30° C. so as to produce an olefin tarpaulin having the thickness of 600 μm.

EXAMPLES 2~5

An olefin tarpaulin was produced in the same manner as example 1 except that the density of warp and weft in the polyester fabrics was changed as shown in Table 1.

EXAMPLES 6~10

An olefin tarpaulin was produced in the same manner as example 1 except that the composition ratio of the coating composition was changed as shown in Table 2.

EXAMPLES 11~15

An olefin tarpaulin was produced in the same manner as example 1 except that the coloring master batch chip was formed by mixing LDPE 75% by weight and pigments of 25% by weight, the adhesion-preventing master batch chip was formed by mixing LDPE of 90% by weight and calcium carbonate of 10% by weight, and the composition ratio of the coating composition was changed as shown in Table 2.

COMPARATIVE EXAMPLES 1~3

An olefin tarpaulin was produced in the same manner as example 1 except that the density of warp and weft in the polyester fabrics was changed as shown in Table 1.

COMPARATIVE EXAMPLES 4~7

An olefin tarpaulin was produced in the same manner as example 1 except that the composition ratio of the coating composition was changed as shown in Table 2.

The tensile, tearing and adhesive strengths of the olefin tarpaulin formed according to the example 1~15 and the comparative examples 1~7 were measured through ASTM 751~89 measurement as shown in Table 1 and Table 2.

TABLE 1

The physical properties according to the density of warp and weft in polyester fabrics.

| | Density of Warp and Weft in Polyester Fabrics (threads/inch) | Physical Properties | | |
|---|---|---|---|---|
| | | Tensile Strength ($Kg_f$) | Tearing Strength ($Kg_f$) | Adhesive Strength ($Kg_f$/cm) |
| EXAMPLE 1 | 5 | 23.4 | 10.2 | 14.1 |
| EXAMPLE 2 | 7 | 30.7 | 11.3 | 12.2 |
| EXAMPLE 3 | 9 | 42.5 | 14.2 | 10.2 |
| EXAMPLE 4 | 12 | 51.1 | 17.3 | 9.4 |
| EXAMPLE 5 | 15 | 61.2 | 15.2 | 9.0 |
| COMPARATIVE EXAMPLE 1 | 3 | 14.4 | 8.2 | 15.2 |
| COMPARATIVE EXAMPLE 2 | 4 | 17.7 | 9.3 | 14.6 |
| COMPARATIVE EXAMPLE 3 | 21 | 63.3 | 16.4 | 2.7 |

TABLE 2

The physical properties according to the composition ratio of the coating composition.

| | Coating Composition (LLDPE/Elastomer/Coloring Master Batch Chip/Adhesion-Preventing Master Batch Chip) | Physical Properties | | |
|---|---|---|---|---|
| | | Tensile Strength ($Kg_f$) | Tearing Strength ($Kg_f$) | Adhesive Strength ($Kg_f$/cm) |
| EXAMPLE 6 | 94.5/5/0.5/0 wt % | 49.2 | 10.2 | 9.0 |
| EXAMPLE 7 | 83/15/2/0 wt % | 47.3 | 12.3 | 9.3 |
| EXAMPLE 8 | 70/25/5/0 wt % | 42.5 | 14.2 | 10.2 |
| EXAMPLE 9 | 50/40/10/0 wt % | 30.2 | 11.3 | 13.3 |
| EXAMPLE 10 | 25/60/15/0 wt % | 23.4 | 10.2 | 15.2 |
| EXAMPLE 11 | 37.5/60/0.5/2 wt % | 50.1 | 16.2 | 15.2 |
| EXAMPLE 12 | 55/40/2/3 wt % | 47.6 | 15.3 | 13.2 |
| EXAMPLE 13 | 65/25/5/5 wt % | 42.5 | 14.2 | 10.2 |
| EXAMPLE 14 | 68/15/10/7 wt % | 38.6 | 12.2 | 9.5 |
| EXAMPLE 15 | 65/10/15/10 wt % | 35.5 | 10.3 | 9.0 |
| COMPARATIVE EXAMPLE 4 | 10/75/10/5 wt % | 18.2 | 10.2 | 15.7 |
| COMPARATIVE EXAMPLE 5 | 56/41/0/3 wt % | 16.43 | 9.3 | 16.0 |
| COMPARATIVE EXAMPLE 6 | 75/0/15/10 wt % | 35.0 | 10.1 | 8.4 |
| COMPARATIVE EXAMPLE 7 | 40/40/20/0 wt % | 33.4 | 9.4 | 6.2 |

*LLDPE is linear low density polyethylene.

It will be apparent to those skilled in the art that various modifications and variations can be made in the method for fabricating olefin tarpaulins of the present invention without departing from the spirit or scope of the invention. Thus, it is intended that the present invention cover the modifications and variations of this invention provided they come within the scope of the appended claims and their equivalents.

What is claimed is:

1. A method for fabricating olefin tarpaulin, comprising the steps of:
    forming polyester fabrics having a density of warp and weft of 5~20 threads per inch from high strength polyester filaments;
    preparing a coating composition by blending LLDPE (linear low density polyethylene) or LDPE (low density polyethylene) of 15~94.5% by weight, elastomer of ethylene-α-olefin co-polymer of 5~60% by weight which is (i) ethylene propylene rubbers or (ii) co-polymers of ethylene and octene or butene; coloring master batch chip of 0.5~15% by weight formed by mixing LLDPE or LDPE with pigments or titanium dioxide (TiO$_2$), and adhesion-preventing master batch chip of 0~10% by weight formed by mixing LLDPE or LDPE with silica or calcium carbonate (CaCO$_3$);
    treating the polyester fabrics with the coating composition; and
    compressing the polyester fabrics so obtained between a calendering roller and a silicone rubber roller to thereby obtain an olefin tarpaulin.

2. The method of claim 1, wherein said high strength polyester filaments have deniers between 200 and 1,500.

3. The method of claim 1, wherein said coating composition is formed by dry-blending or melt-blending.

4. The method of claim 1, wherein said coloring master batch chip is formed by mixing LLDPE or LDPE of 50~90% by weight with 10~50% by weight of an additive.

5. The method of claim 1, wherein said adhesion-preventing master batch chip is formed by mixing LLDPE or LDPE of 50~90% by weight with silica or calcium carbonate (CaCO$_3$) of 10~50% by weight.

6. The method of claim 1, wherein said tarpaulin has a thickness between 300 and 900 μm.

7. The method of claim 1, wherein said elastomer of ethylene-α-olefin co-polymer is ethylene propylene rubbers, or co-polymers of ethylene of 70~90% by weight and octene or butene of 10~30% by weight.

8. The method of claim 1, further comprising the steps of:
    melting the coating composition by a kneader having a temperature between 200° and 300° C.;
    treating the coating composition on both sides of the polyester fabrics through an extruding die having a temperature between 260° and 330° C.; and
    compressing the polyester fabrics between a calendering roller and a silicone rubber roller.

9. The method of claim 1 or 8, wherein said calendering roller which is in contact with the coating composition is an unpolished roller.

10. The method of claim 4, wherein said additive is a pigment.

11. The method of claim 4, wherein said additive is titanium oxide (TiO$_2$).

* * * * *